United States Patent
Park et al.

(10) Patent No.: US 10,636,417 B2
(45) Date of Patent: Apr. 28, 2020

(54) METHOD AND APPARATUS FOR PERFORMING VOICE RECOGNITION ON BASIS OF DEVICE INFORMATION

(71) Applicant: SAMSUNG ELECTRONICS CO., LTD., Suwon-si (KR)

(72) Inventors: Chi-youn Park, Suwon-si (KR); Cheong-jae Lee, Suwon-si (KR); Nam-hoon Kim, Seongnam-si (KR); Kyung-min Lee, Suwon-si (KR); Jae-won Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/093,323

(22) Filed: Apr. 7, 2016

(65) Prior Publication Data
US 2016/0232894 A1 Aug. 11, 2016

Related U.S. Application Data

(63) Continuation of application No. PCT/KR2014/009482, filed on Oct. 8, 2014.
(Continued)

(30) Foreign Application Priority Data
Oct. 8, 2014 (KR) .................. 10-2014-0135971

(51) Int. Cl.
*G10L 15/19* (2013.01)
*G10L 15/06* (2013.01)
(Continued)

(52) U.S. Cl.
CPC ............ *G10L 15/19* (2013.01); *G10L 15/063* (2013.01); *G10L 15/34* (2013.01); *G10L 2015/0635* (2013.01); *G10L 2015/228* (2013.01)

(58) Field of Classification Search
CPC .......................... G10L 15/34; G10L 2015/228
See application file for complete search history.

(56) References Cited

U.S. PATENT DOCUMENTS

| 5,544,654 A | 8/1996 | Murphy et al. |
| 6,529,875 B1 | 3/2003 | Nakajima et al. |

(Continued)

FOREIGN PATENT DOCUMENTS

| JP | 2003202890 A | 7/2003 |
| KR | 1020010080655 A | 8/2001 |

(Continued)

OTHER PUBLICATIONS

International Search Report and Written Opinion (PCT/ISA/210 & PCT/ISA/237) dated Dec. 24, 2014, issued by the International Searching Authority in counterpart International Application No. PCT/KR2014/009482.

(Continued)

*Primary Examiner* — Samuel G Neway
(74) *Attorney, Agent, or Firm* — Sughrue Mion, PLLC

(57) ABSTRACT

A method of obtaining a grammar model to perform speech recognition includes obtaining information about a state of at least one device, obtaining grammar model information about the at least one device based on the obtained information, and generating a grammar model to perform the speech recognition based on the obtained grammar model information.

11 Claims, 11 Drawing Sheets

Related U.S. Application Data

(60) Provisional application No. 61/888,149, filed on Oct. 8, 2013.

(51) Int. Cl.
 *G10L 15/34* (2013.01)
 *G10L 15/22* (2006.01)

(56) References Cited

U.S. PATENT DOCUMENTS

| | | | |
|---|---|---|---|
| 6,743,175 B2 | 6/2004 | Greenberg | |
| 8,221,324 B2* | 7/2012 | Pedersen | A61B 5/6805 |
| | | | 361/679.02 |
| 8,478,593 B2 | 7/2013 | Blanchard et al. | |
| 9,502,029 B1* | 11/2016 | Bell | G10L 15/22 |
| 2002/0013710 A1* | 1/2002 | Shimakawa | G06F 3/16 |
| | | | 704/275 |
| 2004/0030560 A1* | 2/2004 | Takami | G10L 15/00 |
| | | | 704/275 |
| 2004/0267518 A1 | 12/2004 | Kashima et al. | |
| 2005/0114140 A1* | 5/2005 | Brackett | G10L 15/01 |
| | | | 704/270 |
| 2007/0294084 A1* | 12/2007 | Cross | 704/251 |
| 2008/0154604 A1 | 6/2008 | Sathish et al. | |
| 2013/0102295 A1* | 4/2013 | Burke | H04L 67/125 |
| | | | 455/414.4 |
| 2013/0238326 A1* | 9/2013 | Kim | G06F 3/167 |
| | | | 704/231 |
| 2013/0346077 A1* | 12/2013 | Mengibar | G10L 15/265 |
| | | | 704/235 |
| 2014/0067403 A1* | 3/2014 | Burke | G10L 15/22 |
| | | | 704/275 |
| 2014/0244259 A1* | 8/2014 | Rosario | G10L 15/08 |
| | | | 704/254 |
| 2014/0324431 A1* | 10/2014 | Teasley | G10L 15/22 |
| | | | 704/246 |
| 2016/0232894 A1* | 8/2016 | Park | G10L 15/19 |

FOREIGN PATENT DOCUMENTS

| | | |
|---|---|---|
| KR | 10-0534502 B1 | 11/2006 |
| KR | 1020080001873 A | 1/2008 |
| KR | 1020120037136 A | 4/2012 |
| WO | 0124704 A1 | 4/2001 |

OTHER PUBLICATIONS

Communication dated Dec. 27, 2018, issued by the State Intellectual Property Office of the People's Republic of China in counterpart Chinese Patent Application No. 201480067289.7.

Communication dated May 29, 2019, issued by the Indian Patent Office in counterpart Indian Patent Application No. 201627011312.

* cited by examiner

METHOD AND APPARATUS FOR PERFORMING VOICE RECOGNITION ON BASIS OF DEVICE INFORMATION

CROSS REFERENCE TO RELATED APPLICATIONS

This application is a continuation of International Patent Application No. PCT/KR2014/009482 filed on Oct. 8, 2014, claiming priority from U.S. Provisional Application No. 61/888,149 filed Oct. 8, 2013 and Korean Patent Application No. 10-2014-0135971 filed on Oct. 8, 2014, the contents of which are incorporated herein by reference.

TECHNICAL FIELD

The present inventive concept relates to a method and apparatus for performing speech recognition based on information about a device.

BACKGROUND ART

Speech recognition is a technology of automatically converting a received input of a user's speech into text to recognize the speech. Recently, speech recognition is being used as an interface technology to replace keyboard inputs in smartphones or TVs.

In general, a speech recognition system may perform speech recognition by using a sound model, a grammar model, and a pronunciation dictionary. To perform speech recognition on a predetermined word from a speech sound in the speech recognition system, it is necessary to previously establish a grammar model and a pronunciation dictionary with respect to the predetermined word.

DETAILED DESCRIPTION OF THE INVENTION

Technical Solution

The present inventive concept provides a method and apparatus for performing speech recognition based on information about a device. In detail, the present inventive concept provides a method and apparatus for performing speech recognition based on information about a state of a device that is controllable according to a result of the speech recognition.

Advantageous Effects

According to an exemplary embodiment, since a grammar model is generated according to state information of a device, a possibility of misrecognition during speech recognition may be reduced.

BEST MODE

Figure 1:
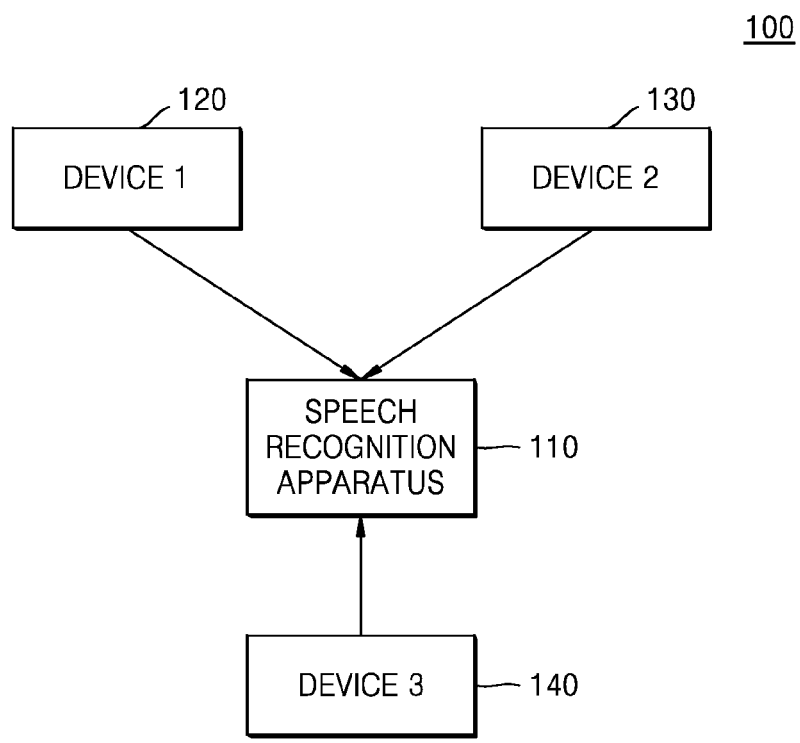
FIG. 1 is a block diagram illustrating a speech recognition system including at least one device and a speech recognition apparatus according to an exemplary embodiment.

According to an aspect of the present inventive concept, there is provided a method of obtaining a grammar model to perform speech recognition, which includes obtaining information about a state of at least one device, obtaining grammar model information about the at least one device based on the obtained information, and generating a grammar model to perform the speech recognition based on the obtained grammar model information.

The information about the state of the at least one device may include at least one of information about an operation state of each device, information about whether each device is controllable, information about a position where each device is installed or connected, and an operation that is performable in each device.

The grammar model information may include at least one piece of pattern information in which a text string is to be inserted based on the information about the state of the at least one device. The generating of the grammar model may include obtaining a pronunciation table to determine the text string to be inserted in the pattern information, obtaining at least one text string corresponding to the pattern information according to the information about the state of the at least one device, from the pronunciation table, and obtaining the grammar model information about the at least one device by inserting the obtained text string in the pattern information included in the grammar model information.

The method may further include performing speech recognition based on the generated grammar model.

Whenever the state of the at least one device changes, the information about the state of the at least one device may be obtained, the grammar model information may be obtained based on the obtained information, and the grammar model may be generated based on the obtained grammar model information.

When the at least one device is a probe, the grammar model information about the device may include an app or preset set with respect to the probe, or a control command that is executable in an ultrasound apparatus of the probe, according to a type of the probe.

According to another aspect of the present inventive concept, there is provided an apparatus for obtaining a grammar model to perform speech recognition, which includes a receiving portion obtaining information about a state of at least one device and obtaining grammar model information about the at least one device based on the obtained information, and a control portion generating a grammar model to perform the speech recognition based on the obtained grammar model information.

MODE OF THE INVENTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. In the following description and accompanying drawings, known functions will not be described in detail so as not to unnecessarily obscure the essence of the present inventive concept.

The terms and words used in the present specification and claims should not be interpreted as being limited to typical meanings or dictionary definitions, but should be interpreted as having meanings and concepts relevant to the technical idea of the present inventive concept based on the rule according to which an inventor can appropriately define the concept of the term to describe most appropriately the best method he or she knows for carrying out the inventive concept. Therefore, the configurations described in the embodiments and drawings of the present inventive concept are merely most preferable embodiments but do not represent all of the technical spirit of the present inventive concept. Thus, the present inventive concept should be construed as including all the changes, equivalents, and substitutions included in the spirit and scope of the present inventive concept at the time of filing this application. In the accompanying drawings, some components are exaggerated or omitted or schematically illustrated. Further, the size of each element does not entirely reflect an actual size thereof. Exemplary embodiments are not limited by a relative size or spacing drawn in each figure.

Throughout the specification, when a part "includes" or "comprises" an element, the part may further other elements unless specified otherwise. The term "unit" used in the present specification refers to a software component, or a hardware component such as a field-programmable gate array (FPGA) or an application-specific integrated circuit (ASIC), and performs a certain function. However, the "unit" is not limited to software or hardware. The "unit" may be configured in an addressable storage medium and may be configured to operate one or more processors. Hence, the "unit" includes elements such as software elements, object-oriented software elements, class elements, and task elements, and processes, functions, attributes, procedures, subroutines, segments of program codes, drivers, firmware, micro-codes, circuits, data, databases, data structures, tables, arrays, and variables. The functions provided in the elements and the units may be combined into a fewer number of elements and units or may be divided into a larger number of elements and units. Expressions such as "at least one of," when preceding a list of elements, modify the entire list of elements and do not modify the individual elements of the list.

Exemplary embodiments will be described below in detail with reference to the accompanying drawings so that those of ordinary skill in the art may easily implement the inventive concept. The inventive concept may, however, be embodied in many different forms and should not be construed as being limited to the exemplary embodiments set forth herein. In addition, portions irrelevant to the description of the exemplary embodiments will be omitted in the drawings for a clear description of the exemplary embodiments, and like reference numerals will denote like elements throughout the specification.

Accordingly, the exemplary embodiments are merely described below, by referring to the figures, to explain aspects of the present description.

FIG. 1 is a block diagram illustrating a speech recognition system including at least one device and a speech recognition apparatus according to an exemplary embodiment.

A speech recognition system 100 according to an exemplary embodiment may include a speech recognition apparatus 110 performing speech recognition and at least one of devices 120, 130, and 140. The speech recognition apparatus 110 may perform speech recognition on user speech and may control a device based on a text string obtained by performing speech recognition. In detail, the speech recognition apparatus 110 may transmit a control signal to control the device to at least one of the devices 120, 130, and 140 based on the text string obtained as a result of the speech recognition. The devices 120, 130, and 140 may be operated according to the control signal transmitted based on the user's verbal commands.

The speech recognition apparatus 110 may receive information about a state of each device from at least one of the devices 120, 130, and 140. When the state of any device is changed, the speech recognition apparatus 110 may receive information about the changed state. The speech recognition apparatus 110 may obtain information about a grammar model with respect to at least one device based on the received information and generate a grammar model to perform speech recognition from the grammar model information. The speech recognition apparatus 110 may generate a new grammar model to be used for speech recognition whenever the state of at least one device changes.

The grammar model contains information about a probability of appearance of each word and may be used for speech recognition. The grammar model is described in detail below with reference to FIG. 3. A grammar model used for speech recognition in the speech recognition apparatus 110 may be generated based on grammar model information of a device that is controllable. Accordingly, the speech recognition apparatus 110 according to an exemplary embodiment may reduce probability of misrecognition by performing speech recognition based on the grammar model information of a controllable device without supporting an unnecessary grammar model. For example, the unnecessary grammar model is a grammar model of a device that is not controllable by the speech recognition apparatus 110.

The grammar model information includes command models for a device. In other words, the grammar model information may be configured of at least one command model for controlling a device. For example, when a device is a television (TV), the grammar model information may include command models such as "Please increase volume", "To the next channel", etc. The above-described command model may include a grapheme of a command that may be used for speech recognition in the speech recognition apparatus 110.

In addition, a command model of the grammar model information may include, instead of a command of a fixed grapheme, pattern information in which different text strings may be inserted according to a state of a device. For example, a grapheme indicating an installation position of a device or information about identification of an application installed in the device may be inserted in the pattern information. The grapheme that may be inserted in the pattern information includes a grapheme that may be pronounced by a user to perform a verbal command. Information about a position where a device is installed or an application installed in the device may vary according to a state of the device. The speech recognition apparatus 110 may determine a grapheme to be inserted in the pattern information based on the information about a state of a device and may insert a determined grapheme in the pattern information. The speech recognition apparatus 110 that has inserted a grapheme in the pattern information may obtain a grammar model for speech recognition from the grammar model information of each device including a plurality of command models.

The speech recognition apparatus 110 may incorporate pieces of grammar model information of at least one device in which a grapheme is inserted in the pattern information. The speech recognition apparatus 110 may generate the grammar model including the information about the probability of appearance of each word based on the command model of the incorporated grammar model information. The speech recognition apparatus 110 according to an exemplary embodiment may obtain the grammar model with respect to each piece of the grammar model information without incorporating the pieces of grammar model information of the device.

The information about the probability of appearance of each word may include information about a conditional probability of appearance of each word under a condition of appearance of a word before and after some predetermined words. A detailed description thereof is described below with reference to FIG. 3.

The speech recognition apparatus 110 may perform speech recognition to control at least one device based on the generated grammar model.

Figure 2:
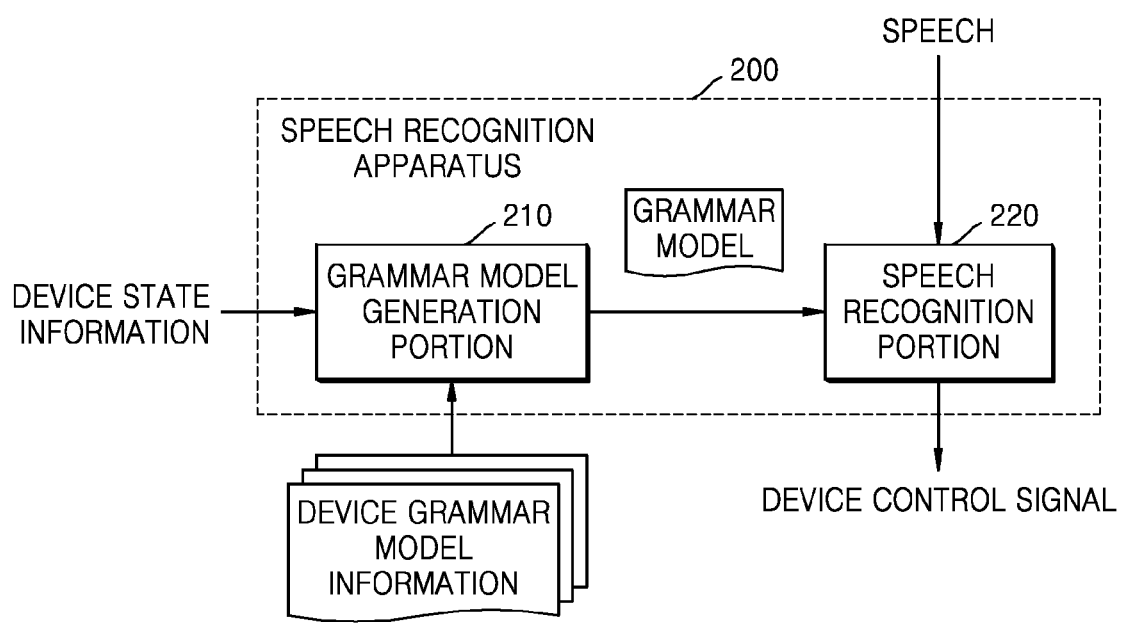
FIG. 2 is an exemplary view illustrating a process of generating a grammar model in a speech recognition apparatus according to an exemplary embodiment.

FIG. 2 is an exemplary view illustrating a process of generating a grammar model in a speech recognition apparatus according to an exemplary embodiment.

The speech recognition apparatus 200 of FIG. 2 may include a grammar model generation portion 210 and a speech recognition portion 220. The grammar model generation portion 210 may generate a grammar model based on information about a state of a device. In detail, the grammar model generation portion 210 may generate a grammar model used for speech recognition by obtaining grammar model information of a controllable device, based on the information about a state of a device. The grammar model used for speech recognition may be obtained as the grammar model generation portion 210 incorporates the grammar model information of at least one controllable device and obtains information about the probability of appearance of each word from a command model included in each piece of the grammar model information.

For example, a controllable device may be a device that is connected to the speech recognition apparatus 110 in a wired or wireless manner to receive a control signal. Alternatively, the controllable device may include a device for which a control right of the speech recognition apparatus 110 or a user of the speech recognition apparatus 110 exists.

Also, the grammar model generation portion 210 may determine a grapheme to be inserted in the pattern information included in the grammar model information based on the information about a state of each device and obtain the grammar model information of each device by inserting the determined grapheme in the pattern information. The grammar model generation portion 210 may generate a grammar model for speech recognition from the grammar model information of each device.

The speech recognition portion 220 may perform speech recognition by using the grammar model generated by the grammar model generation portion 210. In detail, when user speech is input, the speech recognition portion 220 may perform speech recognition by using the grammar model. The speech recognition portion 220 may output a control signal to control the device to at least one device, based on a result of performing the speech recognition.

A method in which a speech recognition portion 300 performs speech recognition by using a grammar model is described in detail below with reference to FIG. 3.

Figure 3:
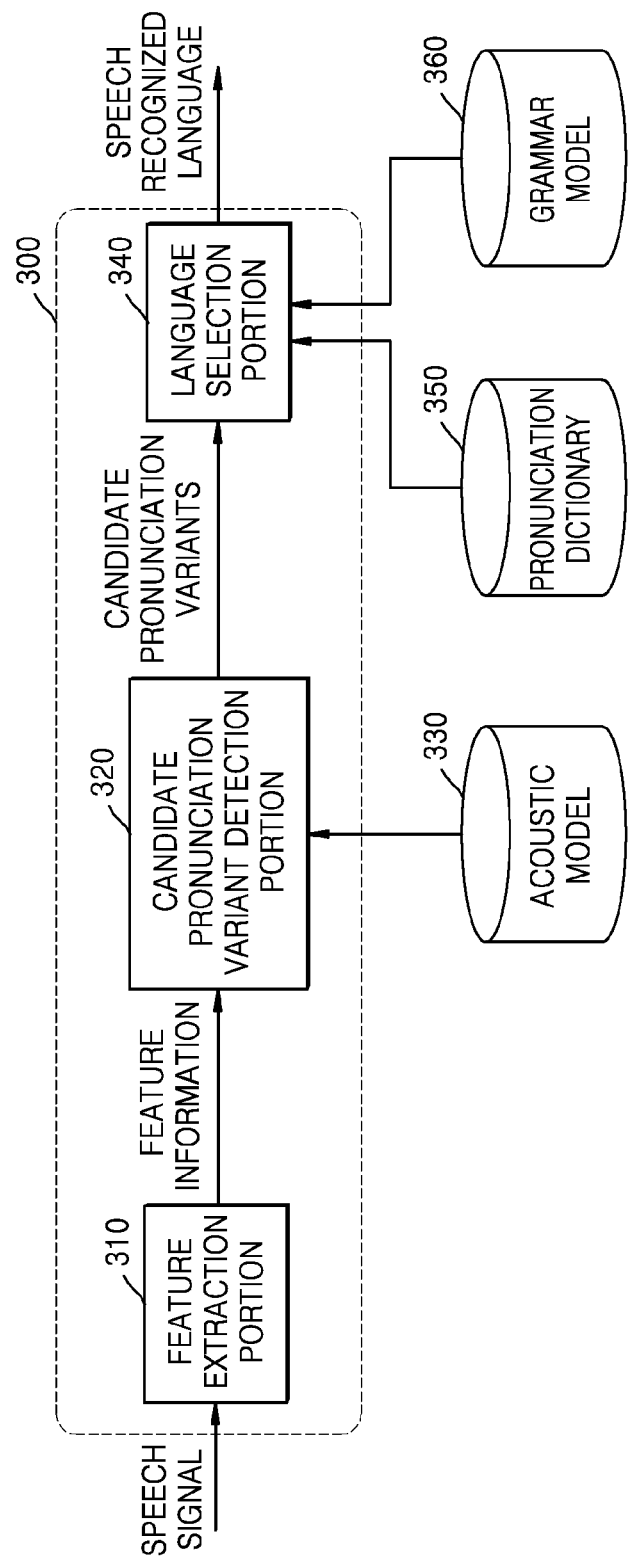
FIG. 3 is a block diagram illustrating an example of a speech recognition portion according to an exemplary embodiment.

FIG. 3 is a block diagram illustrating an example of the speech recognition portion 300 according to an exemplary embodiment.

Referring to FIG. 3, the speech recognition portion 300 may include a feature extraction portion 310, a candidate pronunciation variant detection portion 320, and a language selection portion 340, as constituent elements for performing speech recognition. The feature extraction portion 310 extracts information about a feature of an input speech signal. The candidate pronunciation variant detection portion 320 detects at least one candidate pronunciation variant from the extracted feature information. The language selection portion 340 selects a final language for speech recognition, based on information about a probability of appearance of each candidate pronunciation variant. The information about a probability of appearance of a word signifies information about a probability that a certain word appears in a language that is speech recognized when speech recognition is performed. In the following description, each constituent element of the speech recognition portion 300 is described in detail.

When receiving a speech signal, the feature extraction portion 310 may detect only a speech part actually pronounced by a speaker, thereby extracting information indicating a feature of the speech signal. The information indicating a feature of the speech signal may include, for example, information indicating the shape of lips or the position of a tongue according to a waveform of the speech signal.

The candidate pronunciation variant detection portion 320 may detect at least one of candidate pronunciation variant that may match the speech signal, by using the extracted speech signal feature information and an acoustic model 330. A plurality of candidate pronunciation variants may be detected according to the speech signal. For example, since "jyeo" and "jeo" are pronounced similarly to each other, a plurality of candidate pronunciation variants including the pronunciations of "jyeo" and "jeo" may be detected with respect to the same speech signal. Although the candidate pronunciation variants may be detected in units of words, the present exemplary embodiment is not limited thereto and the candidate pronunciation variants may be detected in a variety of units such as phonemes.

The acoustic model 330 may include information to detect the candidate pronunciation variants from the information about a feature of the speech signal. Also, the acoustic model 330 may be generated, by using a statistical method, from a large amount of speech data, may be generated from a plurality of pieces of unspecified spoken speech data, or may be generated from spoken speech data collected from a specific speaker. Accordingly, the acoustic model 330 may be individually applied according to a speaker during speech recognition.

The language selection portion 340 may obtain appearance probability information of each of the candidate pronunciation variants detected by the candidate pronunciation variant detection portion 320, by using a pronunciation dictionary 350 and a grammar model 360. The language selection portion 340 selects a final language that is speech recognized, based on the appearance probability information of each of the candidate pronunciation variants. In detail, the language selection portion 340 may determine a word corresponding to each of candidate pronunciation variants by using the pronunciation dictionary 350 and may obtain a value of a probability of appearance of each word determined by using the grammar model 360.

The pronunciation dictionary 350 may include information needed to obtain a word corresponding to the candidate pronunciation variants detected by the candidate pronunciation variant detection portion 320. The pronunciation dictionary 350 may be established from pronunciation variants obtained according to a phoneme variation phenomenon of each word.

The appearance probability value signifies a probability that a current word appears or a probability that a current word simultaneously appears with specific words. The speech recognition portion 300 may perform speech recognition considering the context by using the appearance probability value.

The speech recognition portion 300 obtains words of the candidate pronunciation variants by using the pronunciation dictionary 350 and obtains the appearance probability information with respect to each word by using the grammar model 360, thereby performing speech recognition. The present exemplary embodiment is not limited thereto and the speech recognition portion 300 may obtain the appearance probability information from the grammar model 360 by using the candidate pronunciation variants without obtaining words corresponding to the pronunciation variants through the pronunciation dictionary 350.

The grammar model 360 may include the appearance probability information about words. The appearance probability information may exist for each word. The speech recognition portion 300 may obtain the appearance probability information with respect to words included in each of the candidate pronunciation variants from the grammar model 360.

The speech recognition portion 300 may finally determine a speech recognized word based on the appearance probability information of a word corresponding to each of candidate pronunciation variants in the language selection portion 340 by using the grammar model 360. In other words, the speech recognition portion 300 may finally determine a word having information indicating that the word has the highest appearance probability value as a speech recognized word. The language selection portion 340 may output the speech recognized word as text information.

A method of obtaining a grammar model to perform speech recognition according to an exemplary embodiment is described below with reference to FIGS. 4 and 5.

Figure 4:
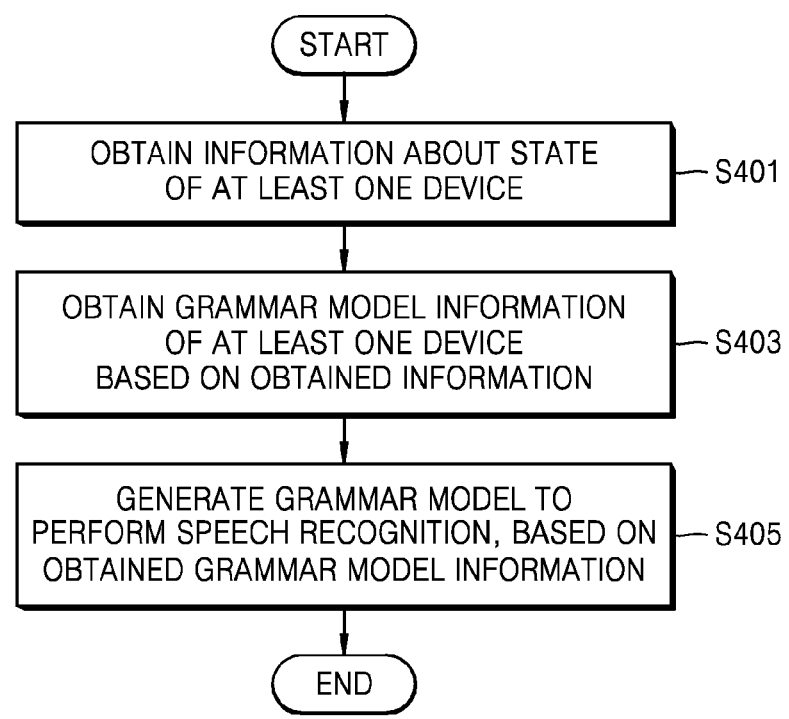
FIG. 4 is a flowchart for describing a method of obtaining a grammar model according to an exemplary embodiment.

FIG. 4 is a flowchart for describing a method for obtaining a grammar model according to an exemplary embodiment.

Referring to FIG. 4, in Operation S401, the speech recognition apparatus 110 may obtain information about a state of at least one device.

The information about a state of a device obtained by the speech recognition apparatus 110 may include at least one of an operation state of each device, a possibility of controlling each device, information about a position where each device is installed or connected, and an operation that is performable in each device.

In Operation S403, the speech recognition apparatus 110 may obtain grammar model information of the at least one device based on the state information obtained in Operation S401.

For example, the speech recognition apparatus 110 may be connected to the device in a wired or wireless manner and may obtain the grammar model information of a device that is controllable according to a speech recognized command.

In Operation S405, the speech recognition apparatus 110 may generate a grammar model to perform speech recognition based on the grammar model information obtained in Operation S403. In detail, the speech recognition apparatus 110 may obtain the grammar model information of each device by inserting a text string in pattern information of the grammar model information obtained in Operation S403, and may generate a grammar model for speech recognition from the obtained grammar model information. The text string that may be inserted in the pattern information may be determined based on the state information obtained in Operation S401.

For example, when a text string corresponding to a position of the device is to be inserted in the pattern information, the speech recognition apparatus 110 may determine the text string to be inserted in the pattern information according to the information about the installation or connection of each device. In other words, the speech recognition apparatus 110 may determine a text string indicating a position where the device is installed or connected, as the text string to be inserted in the pattern information.

Figure 5:
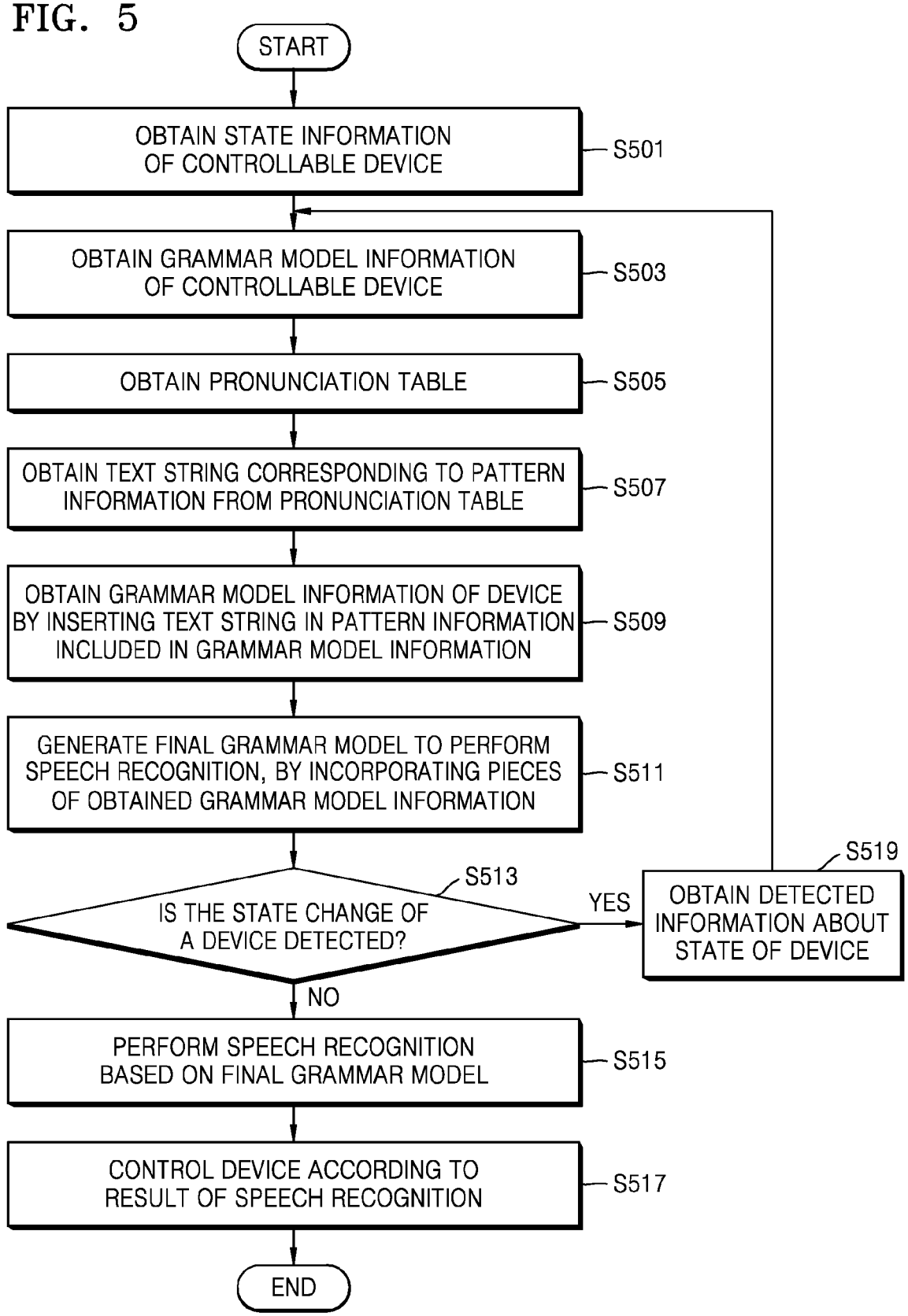
FIG. 5 is a flowchart for describing a method of obtaining a grammar model according to an exemplary embodiment.

FIG. 5 is a flowchart for describing a method for obtaining a grammar model according to an exemplary embodiment.

Referring to FIG. 5, in Operation S501, the speech recognition apparatus 110 may obtain information about a state of a device that is controllable according to a user's verbal command.

For example, the device state information may be configured as shown in Table 1 below.

TABLE 1

| Device   | Slot ID | Installed Application      |
|----------|---------|----------------------------|
| Device 1 | Slot 1  | Application 1              |
| Device 2 | Slot 2  | Application 1, Application 2 |

According to the information about a state of each device shown in Table 1, a slot in which Device 1 is currently installed is Slot 1 and Application 1 is installed in Device 1. As a device is installed in a slot, the speech recognition apparatus 110 may transmit a control signal to the device. Accordingly, the device having slot information may be determined as a controllable device.

In Operation S503, the speech recognition apparatus 110 may obtain the grammar model information of the device that is controllable according to a user's verbal command, based on the state information obtained in Operation S501. According to the state information of a device shown in Table 1, since Devices 1 and 2 having the slot information are controllable according to the verbal command, the speech recognition apparatus 110 may obtain grammar model information of Devices 1 and 2. The grammar model information may be stored in a memory (not shown) of the speech recognition apparatus 110 or may be obtained from the outside.

For example, the grammar model information of a device may be configured as shown in Table 2 below.

TABLE 2

| Device | Grammar Model Information |
| --- | --- |
| Device 1 | \|@Pat1 word1_1 word1_2<br>\|word1_3 word1_4<br>\|word1_1 |
| Device 2 | \|@Pat1 word2_1<br>\|word2_2 word2_3<br>\|@Pat2 |
| Device 3 | \|@Pat 1 word3_1<br>\|word3_2 word3_3<br>\|@Pat2 |

The grammar model information may be configured of at least one of command models, as shown in Table 2. The command model of each device may be formed of text strings divided by "l". Also, "@Pat1" and "@Pat2" included in some command models are pattern information and a text string determined according to the state information may be inserted in the pattern information. "word1_1", "word1_2", etc. denote text strings signifying commands. For example, "word1_1", "word1_2", etc. may include commands such as "make screen brighter", "turn off power", etc.

In Operation S505, the speech recognition apparatus 110 may obtain a pronunciation table. The pronunciation table includes a text string corresponding to each piece of pattern information that may be determined according to the state information of a device. The speech recognition apparatus 110 may determine a text string to be inserted in the pattern information of grammar model information by using the pronunciation table.

For example, the pronunciation table may be configured as shown in Table 3.

TABLE 3

| Patten Information | State Information | Pronunciation Information |
| --- | --- | --- |
| @Pat1 | Installed in Slot 1 | Slot A |
|  | Installed in Slot 2 | Slot B |
|  | Installed in Slot 3 | Slot C |
| @Pat2 | Application 1 installed | Application D |
|  | Application 2 installed | Application E |

Applications D and E corresponding to one piece of pattern information may be applications having the same function or the same user. For example, when the applications D and E are applications having a music play function, a command model including "@Pat2" may be a command model for playing music.

In Operation S507, the speech recognition apparatus 110 may obtain a string text corresponding to the pattern information according to the state information obtained from the pronunciation table in Operation S501. The speech recognition apparatus 110 may obtain a text string to be inserted in the pattern information according to each device. Pronunciation information in the pronunciation table may be configured of a text string that may be pronounced by a user to perform a verbal command. For example, when a user pronounces "Slot 1" as "Slot A", the pronunciation information corresponding to the state information "Slot 1" may be "Slot A".

The above description that the speech recognition apparatus 110 obtains a text string to be inserted in the pattern information from the pronunciation table of Table 3 according to the state information of Table 1 is described below with an example.

In detail, according to the state information, Device 1 is installed in Slot 1 and Application 1 is installed. Accordingly, a text string to be inserted in @Pat1 may be determined to be "Slot A" that corresponds to @Pat1 and Slot 1. Also, a text string to be inserted in @Pat2 may be determined to be "Application D" that corresponds to @Pat2 and Application 1.

Also, according to the state information, Device 2 is installed in Slot 2 and Application 1 and Application 2 are installed. Accordingly, a text string to be inserted in @Pat1 may be determined to be "Slot B" that corresponds to @Pat1 and Slot 2. Also, the text string to be inserted in @Pat2 may be determined to be "Application D" that corresponds to @Pat2 and Application 1 and "Application E" that corresponds to @Pat2 and Application 2.

As described above, a plurality of text strings are determined as a text string to be inserted in @Pat2 of Device 2. In some exemplary embodiments, a text string to be inserted in one piece of pattern information may be determined to be plural according to the state information or pronunciation information.

When a text string corresponding to one piece of pattern information is plural, and when the speech recognition apparatus 110 inserts a text string in pattern information, a plurality of command models in which the respective text strings are inserted in the pattern information may be generated from one command model. For example, the command models of lApplication D and lApplication E may be generated with respect to the command model of l@Pat2 of the grammar model information of Device 2.

In Operation S509, the speech recognition apparatus 110 may obtain the grammar model information of each device by inserting the text string obtained in Operation S507 in the pattern information of the grammar model information.

In detail, for the grammar model information of Device 1 and Device 2, the grammar model information of a device including the command models in which the text strings obtained in Operation S507 are inserted may be obtained as shown in Table 4.

TABLE 4

| Device 1 | \|slot A word1_1 word1_2<br>\|word1_3 word1_4<br>\|word1_1 |
| --- | --- |
| Device 2 | \|slot B word2_1<br>\|word2_2 word2_3<br>\|Application D<br>\|Application E |

In Operation S511, the speech recognition apparatus 110 may incorporate pieces of the grammar model information of a device generated in Operation S509, and may generate a final grammar model to perform speech recognition from the incorporated grammar model information. For example, a final grammar model to perform speech recognition may be generated from the final grammar model information as shown in Table 5.

TABLE 5

| \|slot A word1_1 word1_2<br>\|word1_3 word1_4<br>\|word1_1<br>\|slot B word2_1<br>\|word2_2 word2_3<br>\|Application D<br>\|Application E |
| --- |

In detail, the speech recognition apparatus 110 may determine information about the probability of appearance of each word by using at least one of command models of Table 5, thereby generating a final grammar model.

When the speech recognition apparatus 110 detects in Operation S513 whether a state of a device is changed, detected information about a state of a device may be obtained Operation S519. In Operation S513, a detectable device may include a device of which state is changed by the speech recognition apparatus 110 from an uncontrollable state to a controllable state, or vice versa. Also, in Operation S513, a detectable device may include a device having a changed state among the devices that are controllable by the speech recognition apparatus 110.

For example, the speech recognition apparatus 110 may detect whether at least one device is installed in or detached from a slot. Alternatively, the speech recognition apparatus 110 may detect whether an application is installed at or removed from at least one device.

The speech recognition apparatus 110, in Operation S503 or later, may generate a grammar model according to the state information obtained from Operation S519 as described above. Accordingly, according to an exemplary embodiment, a final grammar model may be generated based on new state information whenever the state of a device changes.

In Operation S515, when a user's verbal command is input, the speech recognition apparatus 110 may perform speech recognition based on the final grammar model. The speech recognition apparatus 110 may perform speech recognition based on the final grammar model at a time when the speech recognition is performed. The grammar model that may be used for speech recognition may include not only the grammar model generated in Operation S511, but also other grammar models. For example, the grammar model to be used for speech recognition may include a grammar model that may be commonly used for basic speech recognition.

In Operation S517, the speech recognition apparatus 110 may control a device according to a result of the speech recognition performed in Operation S515. In other words, the speech recognition apparatus 110 may generate a control signal to control the device according to the result of the speech recognition and may transmit the control signal to the device.

An example of a method of obtaining a grammar model according to the state of a device is described in detail with reference to FIGS. 6 and 7.

Figure 6:
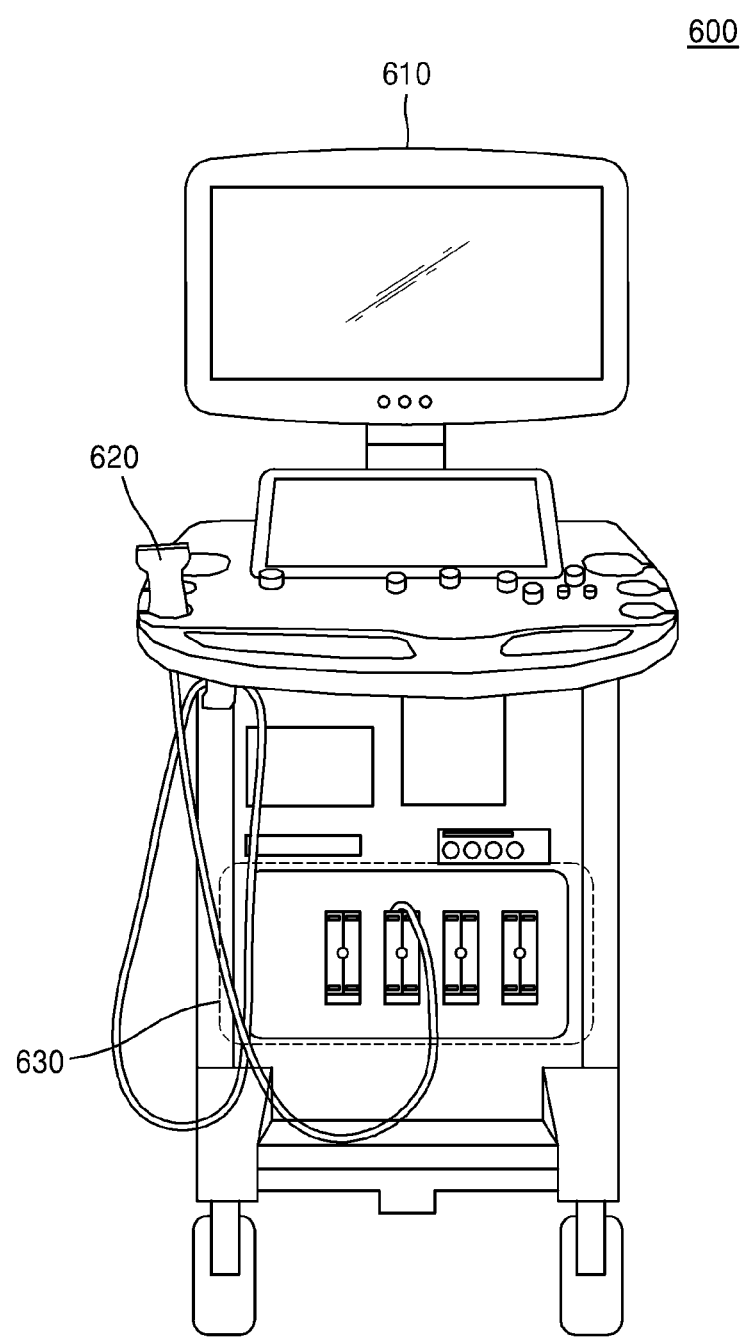
FIG. 6 is a view for describing an example of a method of obtaining a grammar model to control an ultrasound apparatus according to an exemplary embodiment.

FIG. 6 is a view for describing an example of a method for obtaining a grammar model to control an ultrasound apparatus according to an exemplary embodiment.

Referring to FIG. 6, an ultrasound apparatus 600 may include a probe 620, slots 630 in each of which the probe 620 may be installed, and a microphone 610 through which a user's verbal command may be input.

The probe 620 may function as the above-described at least one device that may be controlled according to the user's verbal command input through the microphone 610. Accordingly, according to an exemplary embodiment, the grammar model information may exist for each probe 620.

For example, as shown in Table 6, the grammar model information may exist for each probe identification (ID).

TABLE 6

| Probe ID | Grammar Model Information for Each Probe |
|---|---|
| 53 | \|@Probe# Abdomen Aorta<br>\|Content LVO |

TABLE 6-continued

| Probe ID | Grammar Model Information for Each Probe |
|---|---|
| 6D | \|@Probe#<br>\|Abdomen<br>\|@Probe# OB<br>\|OB 1stTrimester<br>\|@Probe#<br>\|Gynecology |
| 61 | \|@Probe# Smallparts<br>\|Vascular Carotid<br>\|@Probe#<br>\|MSK |

The state information existing for each probe may be configured as shown in Table 7.

TABLE 7

| Probe ID | Slot Information | App | Preset |
|---|---|---|---|
| 53 | 1 | Abdomen | Aorta |
| 6D | 2 | Abdomen | General |

In addition, the grammar model information may be present for each piece of detailed state information. For the ultrasound apparatus 600, the grammar model information may be present for each app (application) indicating a portion that is ultrasound scanned and each preset indicating information about the setting of the ultrasound apparatus 600.

As an example, the grammar model information may be configured for each App. Preset as shown in Table 8.

TABLE 8

| App.Preset | Abdomen.Aorta | Abdomen.General | TCD (trans cranial doppler).General |
|---|---|---|---|
| Grammar Model Information | \|SMA<br>\|Bifurcation<br>\|CA<br>\|CIA | \|Stomach<br>\|Hemangioma<br>\|Cirrhosis<br>\|Mass | \|PCA<br>\|P-COM<br>\|PICA<br>\|MCA |

The ultrasound apparatus 600 may generate a grammar model for speech recognition based on the grammar model information corresponding to information about app and preset that may be obtained from the state information of the probe 620, in addition to the grammar model information of the controllable probe. For example, grammar model information about Probe 53 may include the grammar model information about Probe 53 shown in Table 6 and the grammar model information of "Abdomen.Aorta" shown in Table 8. Likewise, grammar model information about Probe 6D may include the grammar model information about Probe 6D shown in Table 6 the grammar model information of "Abdomen.General" shown in Table 8 based on the state information of Table 7.

The ultrasound apparatus 600 may incorporate the grammar model information of a probe and the grammar model information according to the App and Preset information, and may determine a text string that is pronunciation information to be inserted in the pattern information for each probe. The ultrasound apparatus 600 may obtain a final grammar model by inserting the determined text string in the pattern information.

The ultrasound apparatus 600 may obtain a text string to be inserted in the pattern information among the grammar model information about each probe with reference to the pronunciation table of Table 9 below. The pronunciation table of Table 9 is a mere example and the pronunciation information, that is, a text string, corresponding to the pattern information may be determined based on various pieces of state information.

TABLE 9

| Pattern Information | State Information | Pronunciation Information |
| --- | --- | --- |
| @Probe# | Slot 1 | Slot A |
|  | Slot 2 | Slot B |
|  | Slot 3 | Slot C |
| @App | Abdomen | Abdomen, Abdomen |
|  | OB(obstetrics) | Obstetrics, OB |
| @Preset | General | General |
| @App_Preset | Abdomen.Aorta | Abdomen Aorta |
|  | Abdomen.General | Abdomen General |

The portion (app) to be scanned may be determined according to a type of a probe. For example, for Probe 6D, an obstetrics (OB) app, a gynecology app, a urology app, etc. may be scanned.

Also, a preset that may be set may be determined according to the app. For example, for an OB app, a settable preset may be early pregnancy (1stTrimester). Also, for a gynecology app, a settable preset may be uterus and adnexa. In addition, for a urology app, a settable preset may be prostate.

For @App, a usable control command is limited according to the type of a probe in use. Also, for @Preset, a usable control command is limited according to the type of a probe and App in use. Accordingly, the ultrasound apparatus 600 may obtain the grammar model information including command models that may be included in verbal commands according to the usable control command according to the state information for each probe.

The ultrasound apparatus 600 may obtain grammar model information about App or Preset that may be currently instructed based on the type of each probe and the portion (app) that is currently scanned, and may obtain a final grammar model. As an example, the ultrasound apparatus 600 may obtain the grammar model information about the App or Preset that may be currently instructed, according to whether it is in a state of selecting App or a state of selecting Preset, and may obtain the final grammar model.

A method of obtaining a grammar model according to each state of the ultrasound apparatus 600 is described in detail below with reference to FIGS. 7 and 8.

Figure 7:
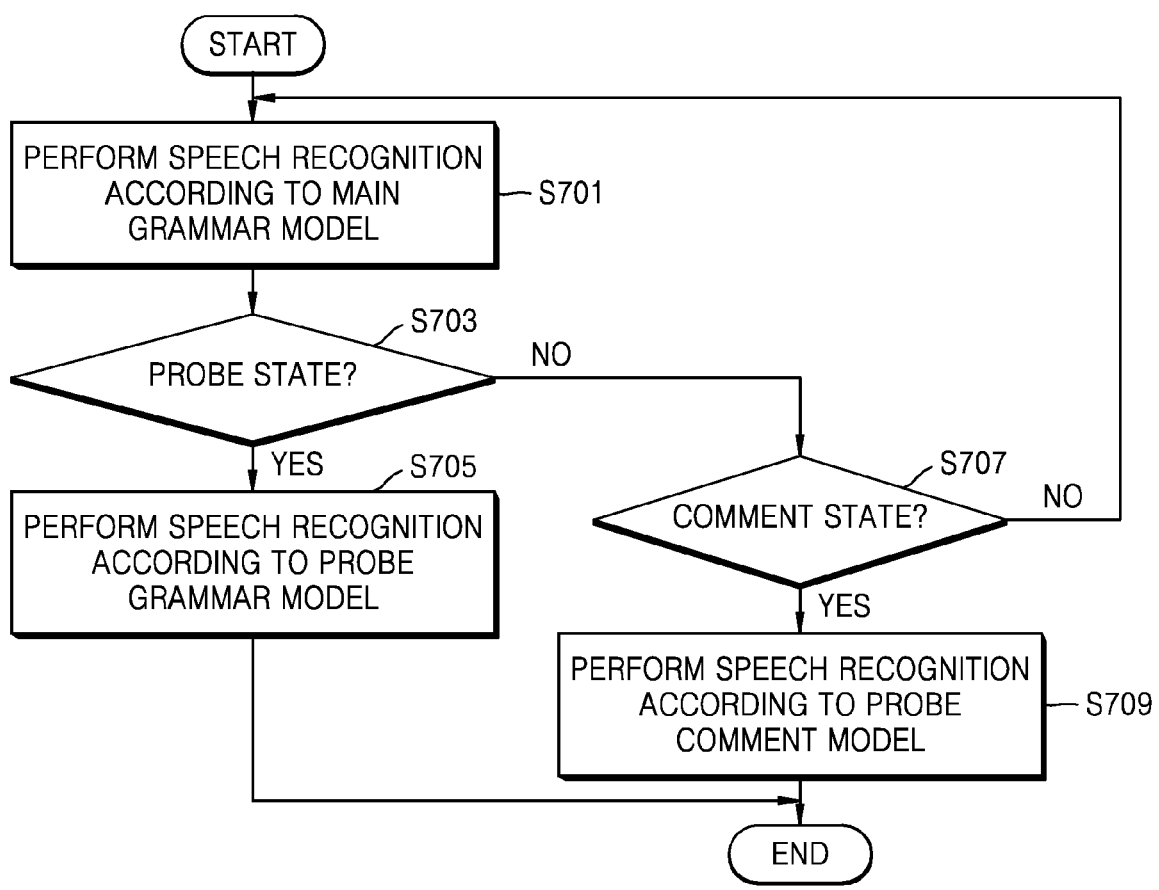
FIG. 7 is a flowchart for describing a method of obtaining a grammar model in an ultrasound apparatus according to an exemplary embodiment.

FIG. 7 is a flowchart for describing a method for obtaining a grammar model in an ultrasound apparatus according to an exemplary embodiment.

Referring to FIG. 7, in Operation S701, an ultrasound apparatus 700 may perform speech recognition according to a main grammar model that is basically set. The main grammar model may include the above-described grammar model that may be commonly used. The state of Operation S701 is a basic state and may be referred to as a main state.

In Operation S703, a current state may be changed to a probe state, that is, a state of selecting a probe, according to a probe change request. The probe change request signifies a request to change a scan image of a probe that is current output to scan image of another probe. In the probe state, not only the probe but also App may be selected altogether.

In Operation S705, the ultrasound apparatus 600 may perform speech recognition according to a grammar model of a probe that is currently controllable or installed in a slot. For example, the ultrasound apparatus 600 may perform speech recognition according to the grammar model obtained based on the grammar model information for each probe shown in Table 6.

When the probe is selected according to speech recognition, the state of the ultrasound apparatus 600 may be changed from the probe state to the main state. In addition, not only the probe but also App may be selected altogether according to the speech recognition.

Also, in Operation S707, the current state of the ultrasound apparatus 600 may be changed to a comment state, that is, a state of determining preset information, according to the scan portion or the preset determination state. The above-described preset determination request may be generated according to a control signal that is generated according to a user's verbal or button input or a predetermined algorithm.

In Operation S709, the ultrasound apparatus 600 may perform speech recognition according to a grammar model about Preset, based on the currently selected probe type or App. For example, speech recognition may be performed according to the grammar model obtained based on the grammar model information of App. Preset shown in Table 8.

When Preset information is determined according to the speech recognition, the state of the ultrasound apparatus 600 may be changed again from the comment state to the main state.

Figure 8:
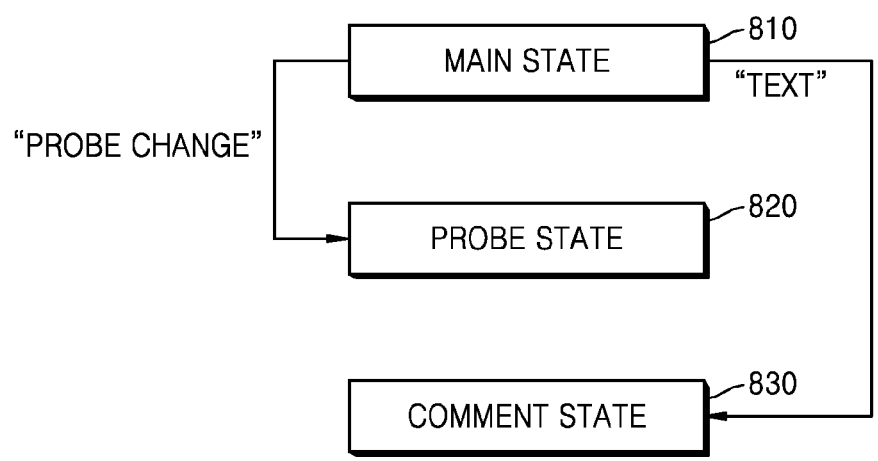
FIG. 8 is a view illustrating an example of a state of an ultrasound apparatus according to an exemplary embodiment.

FIG. 8 is a view illustrating an example of a state of an ultrasound apparatus according to an exemplary embodiment.

Referring to FIG. 8, the state of the ultrasound apparatus 600 may include a main state 810, the probe state 820, and the comment state 830. The exemplary embodiment is not limited thereto and the state of the ultrasound apparatus 600 may further include various states according to the state of the ultrasound apparatus 600.

The main state 810 signifies a basically set state of the ultrasound apparatus 600, as described above and in which speech recognition may be performed according to a grammar model that may be commonly used for the speech recognition. When the probe state 820 or the comment state 830 is completed, the state of the ultrasound apparatus 600 may be automatically changed to the main state 810.

A verbal command model that may be recognized in the main state 810 may include "change probe, text, freeze, etc."

The probe state 820 is a state of the ultrasound apparatus 600 that may be changed on receiving a request to change a scan image of a prone that is currently output. In addition, for example, as a user's verbal command of "change probe" is received, the state of the ultrasound apparatus 600 may be changed from the main state 810 to the probe state 820. When the scan image of a probe that is output according to the verbal command is changed to a scan image of another probe, the ultrasound apparatus 600 may be changed back to the main state 810. In the probe state 820, App that is a portion to be scanned may be selected with the change of a probe.

The verbal command model that may be recognized in the probe state 820 may include "probe 1 abdomen Aorta, Thyroid, etc.". When a verbal command such as "Thyroid" that does not include information to identify a probe is input, the ultrasound apparatus 600 may select a probe that is scanning "Thyroid" or is able to scan "Thyroid". Alternatively, the ultrasound apparatus 600 may change a scan portion of a probe that is being output to "Thyroid".

The comment state 830 signifies a state of the ultrasound apparatus 600 to determine Preset information of the probe that is currently selected. For example, as a user verbal command of "text" is received, the state of the ultrasound apparatus 600 may be changed from the main state 810 to the comment state 830. When the Preset information of the currently selected probe is determined according to the verbal command, the state of the ultrasound apparatus 600 may be changed back to the main state 810.

The verbal command that may be recognized in the comment state 830 may include "Left (Lt) Proximal, Bladder, etc."

A method of obtaining a grammar model when a device that may be controlled by a speech recognition apparatus is home appliances is described below in detail with reference to FIG. 9.

Figure 9:
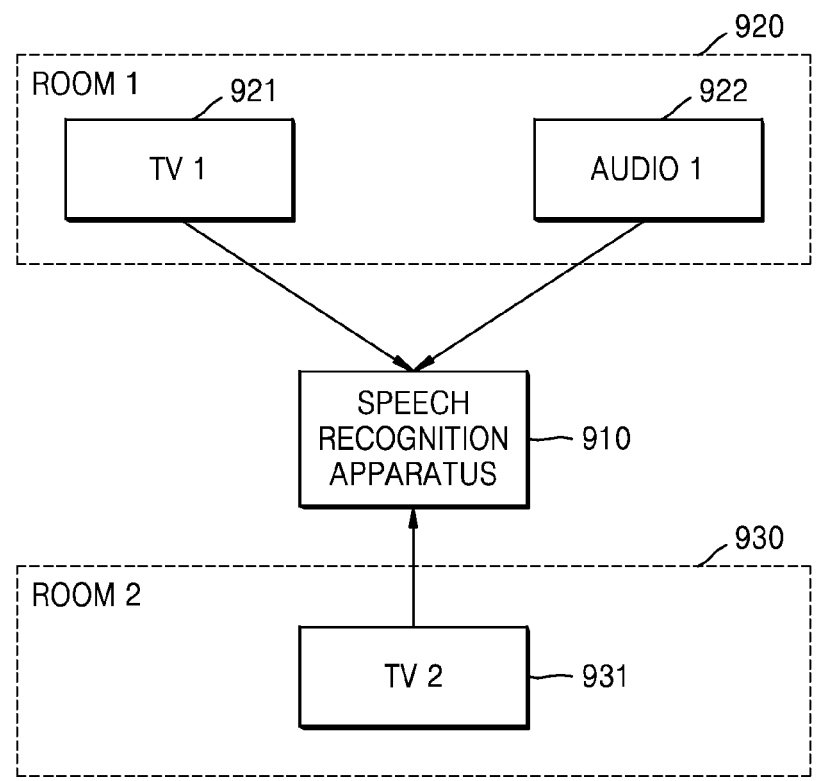
FIG. 9 is a view for describing an example of obtaining a grammar model to control home appliances according to verbal commands.

FIG. 9 is a view for describing an example of obtaining a grammar model to control home appliances according to verbal commands.

Referring to FIG. 9, home appliances that may be controlled by a speech recognition apparatus 910 are present in Room 1 920 or Room 2 930. The speech recognition apparatus 910 may obtain state information about home appliances as shown in Table 10.

TABLE 10

| Home Appliances ID | Position Information |
|---|---|
| TV1 | 1 |
| TV2 | 2 |
| Audio | 1 |

Position Information 1 and 2, respectively, denote Room 1 and Room 2. Room 1 and Room 2 may be respectively pronounced to be "my room" and "living room" in the user's verbal command.

The speech recognition apparatus 910 may obtain grammar model information about controllable home appliances as shown in Table according to the verbal command.

TABLE 11

| Home Appliances ID | Grammar Model Information for Each of Home Appliances |
|---|---|
| TV1 | \|@Room TV Power on<br>\|TV Power off<br>\|@Room TV Volume Up |
| Audio1 | \|@Room Audio Power on<br>\|Audio Power off<br>\|@Room |
| TV2 | \|@Room TV Power on<br>\|TV Power off<br>\|@Room TV Volume Up |

The speech recognition apparatus 910 may determine controllable home appliances to be home appliances having position information, based on state information of the home appliances. For example, the speech recognition apparatus 910 may obtain grammar model information about TV1, TV2, and Audio1 having position information, based on the state information of the home appliances of Table 10.

In addition, the speech recognition apparatus 910 may obtain a pronunciation table about each piece of pattern information to obtain a text string to be inserted in the pattern information included in the grammar model information. For example, a pronunciation table as shown in Table 12 may be obtained.

TABLE 12

| pattern information | Position Information | Pronunciation Information |
|---|---|---|
| @Room | 1 | my room |
| | 2 | living room |

The speech recognition apparatus 910 may determine pronunciation information to be inserted in @Room that is pattern information for each home appliances based on the pronunciation table and the state information. For TV1 and Audio1, since the position information is 1, the pronunciation information to be inserted in @Room may be determined to be "my room". Likewise, for TV2, since the position information is 2, the pronunciation information to be inserted in @Room may be determined to be "living room".

Finally, the speech recognition apparatus 910 may obtain a final grammar model to perform speech recognition from the grammar model information configured as shown in Table 13 below in which the pronunciation information is inserted in each piece of pattern information.

TABLE 13

|my room TV Power on
|TV Power off
|my room TV Volume Up
|my room Audio Power on
|Audio Power off
|my room
|living room TV Power on
|TV Power off
|living room TV Volume Up Internal constituent elements of a speech recognition apparatus are described below in detail with reference to FIGS. 10 and 11.

Figure 10:
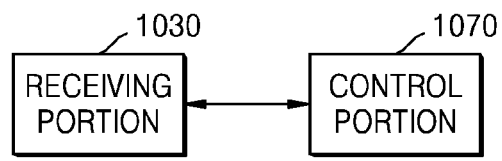
FIGS. 10 and 11 are block diagrams illustrating an internal structure of a speech recognition apparatus for obtaining a grammar model according to an exemplary embodiment.
Figure 11:
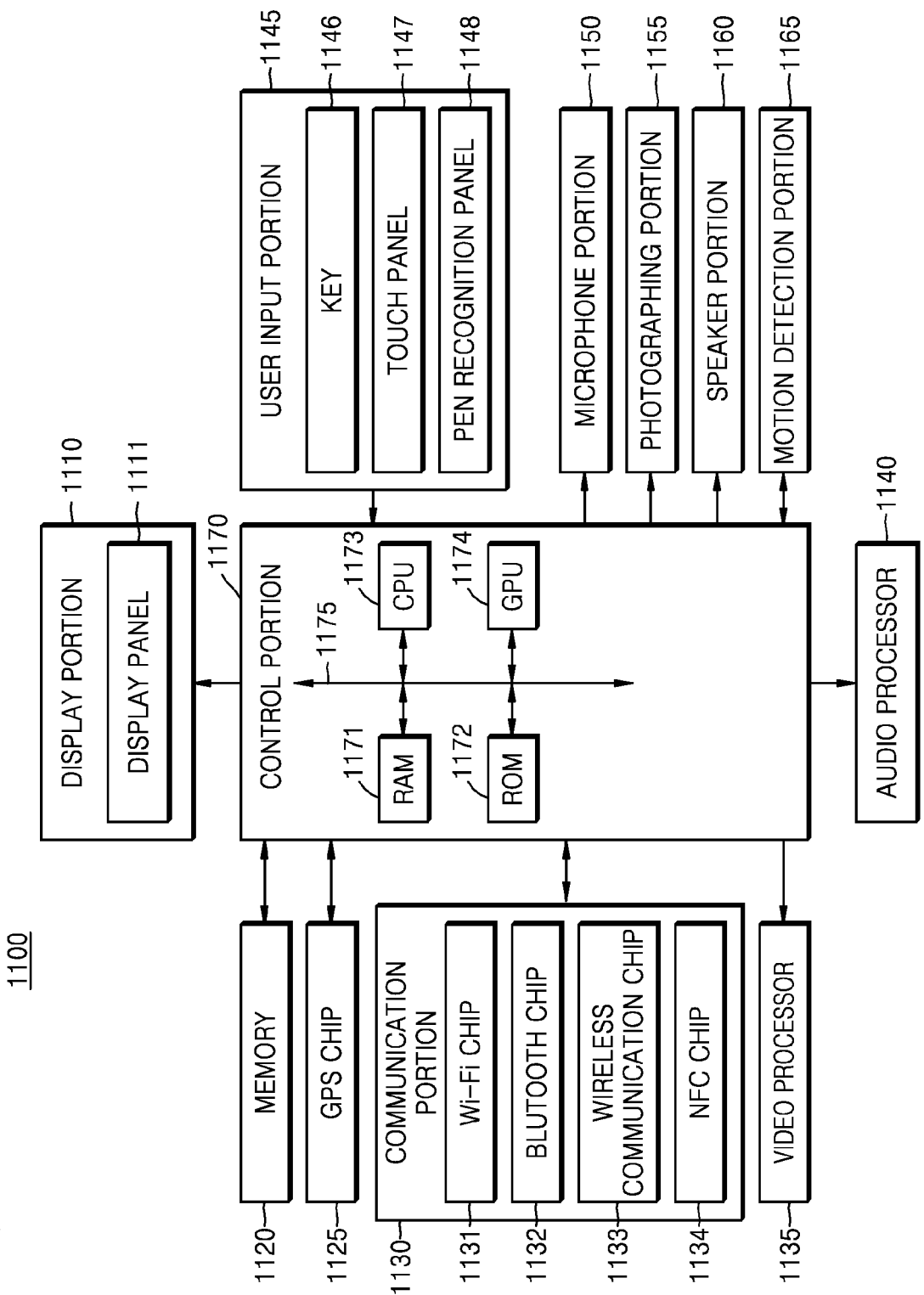

FIGS. 10 and 11 are block diagrams illustrating an internal structure of a speech recognition apparatus for obtaining a grammar model according to an exemplary embodiment. Speech recognition apparatuses 1000 and 1100 of FIGS. 10 and 11 may correspond to the speech recognition apparatus 110 of FIG. 1.

The structure of the speech recognition apparatuses 1000 and 1100 illustrated in FIGS. 10 and 11 may be applied to various types of apparatuses, for example, mobile phones, tablet PCs, PDAs, MP3 players, kiosks, electronic frames, navigation devices, digital TVs, wrist watches, or wearable devices such as smart glasses, virtual reality goggles, or head-mounted display (HMD).

The speech recognition apparatus 110 of FIG. 1 may be terminal apparatuses such as the speech recognition apparatuses 1000 and 1100 illustrated in FIGS. 10 and 11. The present exemplary embodiment is not limited thereto and the speech recognition apparatus 110 may be a server apparatuses that receives and processes a user input from a terminal apparatus. When the speech recognition apparatus 110 is a server apparatus, the speech recognition apparatus 110 may obtain a grammar model based on an externally received user input and the state information of a device. The speech recognition apparatus 110 may perform speech recognition with respect to speech input by using the obtained grammar model and may transmit a control signal to control the device according to a result of the speech recognition.

Referring to FIG. 10, a speech recognition apparatus 1000 may include a receiving portion 1030 and a control portion 1070. In the drawings and below-described exemplary embodiment, each of constituent elements included in the speech recognition apparatus 1000 may be arranged by being distributed in a physical shaft or logical shape, or the constituent elements may be incorporated.

The receiving portion 1030 may obtain state information of a device from the outside. Also, the grammar model information of a device that is controllable according to a verbal command may be obtained based on the state information of the device. In detail, the receiving portion 1030 may determine a device that is controllable according to a verbal command recognized by the speech recognition apparatus 1000, based on the state information of the device. The receiving portion 1030 may obtain the grammar model information of a device that is controllable.

The control portion 1070 may generate a grammar model to perform speech recognition based on the grammar model information of a device obtained by the receiving portion 1030.

However, the constituent elements illustrated in FIG. 10 are not all essential constituent elements. The speech recognition apparatus 1000 may be embodied by a larger number of constituent elements than the number of the illustrated constituent elements or by a smaller number of constituent elements than the number of the illustrated constituent elements.

For example, as illustrated in FIG. 11, the speech recognition apparatus 1100 according to an exemplary embodiment may include a receiving portion 1130, a control portion 1170, a speaker portion 1160, a memory 1120, a global positioning system (GPS) chip 1125, a communication portion 1130, a video processor 1135, an audio processor 1140, a user input portion 1145, a microphone portion 1150, a photographing portion 1155, and a motion detection portion 1165.

The above constituent elements are described below.

The display portion 1110 may include a display panel 1111 and a controller (not shown) for controlling the display panel 1111. The display panel 1111 may be embodied by a variety of types of displays such as liquid crystal displays (LCDs), organic light-emitting diode (OLED) displays, active-matrix organic light-emitting diode (AM-OLED) displays, plasma display panel (PDP) displays, etc. The display panel 1111 may be embodied flexibly, transparently, or to be wearable. The display portion 1110 may be coupled to a touch panel 1147 of a user input portion 1145 to be provided as a touch screen. For example, the touch screen may include an integrated module in which the display panel 1111 and the touch panel 1147 are provided in a stack structure.

The display portion 1110 according to some exemplary embodiments may display an image corresponding to an audio signal output by the speaker portion 1160 according to control of the control portion 1170. The image that may be displayed by the display portion 1110 may include not only a plane image but also a three-dimensional image.

The memory 1120 may include at least one of an internal memory (not shown) and an external memory (not shown).

The internal memory may include at least one of, for example, a volatile memory, such as, dynamic random-access memory (DRAM), static RAM (SRAM), synchronous dynamic RAM (SDRAM), etc., a non-volatile memory, such as, one time programmable read-only memory (OTPROM), programmable ROM (PROM), erasable and programmable ROM (EPROM), electrically erasable and programmable ROM (EEPROM), Mask ROM, Flash ROM, etc., and hard disk drives (HDDs) or solid state drives (SSDs). According to an exemplary embodiment, the control portion 1170 may process commands or data received from the non-volatile memory or at least one of other constituent elements by loading them in the volatile memory. Also, the control portion 1170 may keep data received from or generated by other constituent elements in the non-volatile memory.

The external memory may include, for example, at least one of a compact flash (CF) memory, a secure digital (SD) memory, a micro secure digital (Micro-SD) memory, a mini secure digital (Mini-SD) memory, an extreme digital (xD) memory, and Memory Stick.

The memory 1120 may store various programs and data used for the operation of the speech recognition apparatus 1100. According to an exemplary embodiment, the memory 1120 may temporarily or semi-permanently store at least one of the pronunciation table, the grammar model information for each device, the state information for each device, and the grammar model information.

The control portion 1170 may control the display portion 1110 to allow part of the information stored in the memory 1120 to be displayed on the display portion 1110. In other words, the control portion 1170 may display an image stored in the memory 1120 on the display portion 1110. Also, when a user makes a gesture made in one area of the display portion 1110, the control portion 1170 may perform a control operation corresponding to the user's gesture.

The control portion 1170 may include at least one of RAM 1171, ROM 1172, a central processing unit (CPU) 1173, a graphic processing unit (GPU) 1174, and a bus 1175. The RAM 1171, the ROM 1172, the CPU 1173, the GPU 1174, etc. may be connected to one another via the bus 1175.

The CPU 1173 performs booting by accessing the memory 1120 and using an operating system (O/S) stored in the memory 1120. The CPU 1173 performs a variety of operations by using various programs, contents, or data stored in the memory 1120.

The ROM 1172 stores a command set for system booting. For example, when a turn-on command is input and thus power is supplied to the speech recognition apparatus 1100, the CPU 1173 may copy the O/S stored in the memory 1120 to the RAM 1171 according to the command stored in the ROM 1172 and execute the O/S so as to boot a system. When booting is completed, the CPU 1173 copies various programs stored in the memory 1120 to the RAM 1171 and performs various operations by executing the program copied to the RAM 1171.

When the booting of the speech recognition apparatus 1100 is completed, the GPU 1174 displays a user interface (UI) screen in an area of the display portion 1110. In detail, the GPU 1174 may generate the UI screen including various objects such as contents, icons, menus, etc. The GPU 1174 may calculate attribute values such as the coordinate values, shape, size, or color of each object according to a layout of a screen. The GPU 1174 may generate screens of various layouts including objects based on the calculated attribute values. The screen generated by the GPU 1174 is provided to the display portion 1110 so as to be displayed in each area of the display portion 1110.

The GPS chip 1125 may receive GPS signals from GPS satellites and may calculate a current position of the speech recognition apparatus 1100. The control portion 1170 may calculate a user's position by using the GPS chip 1125 when a navigation program is used or a current position of a user is needed.

The communication portion 1130 may communicate with various types of external devices according to various types of communication methods. The communication portion 1130 may include at least one of a Wi-Fi chip 1131, a Bluetooth chip 1132, a wireless communication chip 1133, and a near-field communication (NFC) chip 1134. The control portion 1170 may communicate with various external devices by using the communication portion 1130.

In an exemplary embodiment, the communication portion 1130 may receive from the outside a pronunciation table, state information of a device, grammar model information, etc. which are needed to obtain a grammar model. The control portion 1170 may obtain a grammar model needed for speech recognition based on the received information.

The Wi-Fi chip 1131 and the Blutooth chip 1132 may perform communication in a Wi-Fi method and a Blutooth method, respectively. When the Wi-Fi chip 1131 or the Blutooth chip 1132 is used, various connection information such as a service set identifier (SSID) or a secession key are first transceived so that communication is established by using the connection information various information. Then, various pieces of information may be transceived. The wireless communication chip 1133 signifies a chip that performs communication according to various communications protocols such as IEEE, Zigbee, the 3rd Generation (3G), the 3rd Generation Partnership Project (3GPP), Long Term Evolution (LTE), etc. The NFC chip 1134 signifies a chip that operates in an NFC method using a band of about 13.56 MHz among various RF-ID frequency bands such as 135 kHz, 13.56 MHz, 433 MHz, 860-960 MHz, 2.45 GHz, etc.

The video processor 1135 may process image data received through the communication portion 1130 or image data stored in the memory 1120. The video processor 1135 may perform various image processes such as decoding, scaling, noise filtering, frame rate conversion, resolution conversion, etc. on the image data. The display portion 1110 may display image data processed by the video processor 1135.

For example, when the image data is an ultrasound image, the video processor 1135 may process an image scanned by a probe.

The audio processor 1140 may process audio data received through the communication portion 1130 or audio data stored in the memory 1120. The audio processor 1140 may perform various processes such as decoding, amplification, noise filtering, etc. on the audio data. For example, the audio processor 1140 may process the audio data corresponding to an image displayed on the display portion 1110.

When a reproduction program is executed on multimedia contents, the control portion 1170 may drive the video processor 1135 and the audio processor 1140 to reproduce the multimedia contents. The speaker portion 1160 may output the audio data generated by the audio processor 1140. For example, the control portion 1170 may process the multimedia contents displayed on the display portion 1110 by using the video processor 1135 and the audio processor 1140.

The user input portion 1145 may receive an input of various commands from a user. The user input portion 1145 may include at least one of a key 1146, a touch panel 1147, and a pen recognition panel 1148.

The speech recognition apparatus 1100 may control the speech recognition apparatus 1100 according to a user input received from at least one of the key 1146, the touch panel 1147, and the pen recognition panel 1148.

The key 1146 may include various types of keys such as mechanical buttons, wheels, etc. which are formed in various areas such as a front side portion, a lateral side portion, a rear side portion, etc. on an outer appearance of a main body (not shown) of the speech recognition apparatus 1100.

The touch panel 1147 may detect a touch input by a user and may output a touch event value corresponding to a detected touch signal. When the touch panel 1147 is coupled to the display panel 1111 to form a touch screen (not shown), the touch screen may be embodied by various types of touch sensors such as a capacitive sensor, a resistive sensor, a piezoelectric sensor, etc. The capacitive sensor calculates touch coordinates by sensing a fine amount of electricity caused by a human body when a part of the human body touches a surface of the touch screen, by using dielectric coated on the surface of the touch screen. The resistive sensor calculates touch coordinates by sensing a flow of electricity between upper and lower (electrode) plates at a touched position when a user touches a touch screen including the two electrode plates. Although a touch event generated from the touch screen may be mainly generated by fingers of a person, it may be generated by an object of a conductive material having a change in capacitance.

The pen recognition panel 1148 may sense a proximity input or a touch input according to an operation of a user's touch pen, for example, a stylus pen or a digitizer pen and may output a sensed pen proximity event or a pen touch event. The pen recognition panel 1148 may be embodied, for example, in an electromagnetic resonance (EMR) method, and may detect a touch or a proximity input according to a change in the intensity of an electromagnetic field by proximity or touch of a pen. In detail, the pen recognition panel 1148 may be configured by including an electromagnetic induction coil sensor having a grid structure and an electronic signal processing portion (not shown) that sequentially provides an alternating signal having a predetermined frequency to each loop coil of the electromagnetic induction coil sensor. When a pen including a resonance circuit is present in the vicinity of the loop coil of the pen recognition panel 1148, a magnetic field transmitted from the loop coil generates a current based on mutual electromagnetic induction in the resonance circuit in the pen. An induction field is generated by a coil forming the resonance circuit of the pen, based on the current. The pen recognition panel 1148 may detect the induction field from the loop coil in a signal receiving state so that a proximity position or touch position of the pen may be detected. The pen recognition panel 1148 may be provided under the display panel 1111 with a predetermined area, for example, an area enough to cover a display area of the display panel 1111.

The microphone portion 1150 may convert an input of user's speech or other sound to audio data. The control portion 1170 may use the user's speech input through microphone portion 1150 in a call operation or may convert the user's speech to audio data and store the audio data in the memory 1120.

The photographing portion 1155 may photograph a still image or a moving picture according to a control of a user. The photographing portion 1155 may be embodied in multiple numbers, for example, a front camera and a rear camera. The control portion 1170 according to an exemplary embodiment may obtain user's external environment information from an image photographed by the photographing portion 1155. The control portion 1170 may determine parameters for display in an optimal state based on the external environment information.

When the photographing portion 1155 and the microphone portion 1150 are provided, the control portion 1170 may perform a control operation according to user's speech input through the microphone portion 1150 or a user's motion recognized by the photographing portion 1155. For example, the speech recognition apparatus 1100 may operate in a motion control mode or a speech control mode. When the speech recognition apparatus 1100 operates in a motion control mode, the control portion 1170 may photograph a user by activating the photographing portion 1155 and may track a change in the user's motion, thereby performing a control operation corresponding thereto. For example, the control portion 1170 may output image and audio signals according to the user's motion input detected by the photographing portion 1155. When the speech recognition apparatus 1100 operates in a speech control mode, the control portion 1170 may analyze the user's speech input through the microphone portion 1150 and may operate in a speech recognition mode in which the control operation is performed according to the analyzed user speech.

In detail, the control portion 1170 may perform speech recognition based on the finally obtained grammar model from the user's speech input through the microphone portion 1150, and may output a control signal to control the device according to a result of the speech recognition.

The motion detection portion 1165 may detect a motion of the main body of the speech recognition apparatus 1100. The speech recognition apparatus 1100 may rotate or tilt in various directions. The motion detection portion 1165 may detect motion characteristics such as a rotational direction, a rotational angle, inclination, etc. by using at least one of various sensors such as a geomagnetic sensor, a gyro sensor, an acceleration sensor, etc.

In addition, although it is not illustrated in FIG. 11, in the present exemplary embodiment, the speech recognition apparatus 1100 may further include a USB port to connect a USB connecter, various external input ports to connect various external terminals such as a headset, a mouse, LAN, etc., a digital multimedia broadcasting (DMB) chip for receiving and processing a DMB signal, various sensors, etc.

The names of the constituent elements of the above-described speech recognition apparatus 1100 may vary. Also, the speech recognition apparatus 1100 according to the present exemplary embodiment may be configured by including at least one of the above-described constituent elements and some constituent elements may be omitted or additional other constituent elements may be further included.

According to an exemplary embodiment, since a grammar model is generated according to state information of a device, a possibility of misrecognition during speech recognition may be reduced.

The methods according to the above exemplary embodiments can be implemented on a computer-readable recording medium as codes that can be read by a computer (including all devices having information processing capabilities). The computer-readable recording medium is any recording media having stored thereon data that can be read by a computer system. Examples of the computer-readable recording medium include ROM, RAM, CD-ROM, magnetic tapes, floppy disks, and optical data storage devices.

While the above descriptions that apply to various embodiments of the present inventive concept are focused on new features of the present inventive concept, it will be understood by those of ordinary skill in the art that various deletions, substitutions, and changes in form and details of the systems and methods described above may be made therein without departing from the spirit and scope of the present inventive concept as defined by the following claims. The scope of the inventive concept is defined not by the detailed description of the inventive concept but by the appended claims, and all differences within the scope of the appended claims and their equivalents will be construed as being included in the present inventive concept.

What is claimed is:

1. A method of performing speech recognition in a speech recognition apparatus, the method comprising:
   obtaining first grammar model information for performing speech recognition of commands for controlling a first device to be controlled by the speech recognition apparatus and second grammar model information for performing speech recognition of commands for controlling a second device to be controlled by the speech recognition apparatus, wherein the first grammar model information comprises first command information of a command and a variable pattern information into which a first text string corresponding to the first device is to be inserted and the second grammar model information comprises second command information of the command and the variable pattern information into which a second text string corresponding to the second device is to be inserted;
   determining a grammar model for performing speech recognition of commands for controlling the first device and the second device based on the first grammar model information and the second grammar model information, wherein the grammar model comprises first pronunciation information corresponding to the first text string for controlling the first device to execute a function corresponding to the command and second pronunciation information corresponding to the second text string for controlling the second device to execute the function corresponding to the command; and
   performing the speech recognition of the commands for controlling the first device and the second device by using the grammar model,
   wherein the first device is different than the second device.

2. The method of claim 1, wherein the first grammar model information is obtained based on first information about a first state of the first device comprising at least one of first information about a first operation state of the first device, first information about whether the first device is controllable, first information about a first position where the first device is installed or connected, and a first operation that is performable in the first device, and
   wherein the second grammar model information is obtained based on second information about a second state of the second device comprising at least one of second information about a second operation state of the second device, second information about whether the second device is controllable, second information about a second position where the second device is installed or connected, and a second operation that is performable in the second device.

3. The method of claim 1, wherein the determining of the grammar model further comprises:
   obtaining a pronunciation table to determine the first text string and the second text string;
   obtaining the first text string and the second text string, from the pronunciation table; and
   determining the grammar model based on the first grammar model information and the second grammar model information including the first text string inserted into the variable pattern information of the first command information and the second text string inserted into the variable pattern information of the second command information.

4. The method of claim 1, wherein the variable pattern information is a field for distinguishing the first device from the second device.

5. The method of claim 1, wherein the first device is a first probe and the second device is a second probe.

6. A speech recognition apparatus comprising:
at least one processor configured to control the speech recognition apparatus to:
obtain first grammar model information for performing speech recognition of commands for controlling a first device to be controlled by the speech recognition apparatus and second grammar model information for performing speech recognition of commands for controlling a second device to be controlled by the speech recognition apparatus, wherein the first grammar model information comprises first command information of a command and a variable pattern information into which a first text string corresponding to the first device is to be inserted and the second grammar model information comprises second command information of the command and the variable pattern information into which a second text string corresponding to the second device is to be inserted;
determine a grammar model for performing speech recognition of commands for controlling the first device and the second device based on the first grammar model information and the second grammar model information, wherein the grammar model comprises first pronunciation information corresponding to the first text string for controlling the first device to execute a function corresponding to the command and second pronunciation information corresponding to the second text string for controlling the second device to execute the function corresponding to the command; and
perform the speech recognition of the commands for controlling the first device and the second device by using the grammar model,
wherein the first device is different than the second device.

7. The speech recognition apparatus of claim 6, wherein the first grammar model information is obtained based on first information about a first state of the first device comprising at least one of first information about a first operation state of the first device, first information about whether the first device is controllable, first information about a first position where the first device is installed or connected, and a first operation that is performable in the first device, and
wherein the second grammar model information is obtained based on second information about a second state of the second device comprising at least one of second information about a second operation state of the second device, second information about whether the second device is controllable, second information about a second position where the first device is installed or connected, and a second operation that is performable in the second device.

8. The speech recognition apparatus of claim 6, wherein the at least one processor is further configured to control the speech recognition apparatus to:
obtain a pronunciation table to determine the first text string and the second text string,
obtain the first text string and the second text string from the pronunciation table, and
determine the grammar model based on the first grammar model information and the second grammar model information including the first text string inserted into the variable pattern information of the first command information and the second text string inserted into the variable pattern information of the second command information.

9. The speech recognition apparatus of claim 6, wherein the first device is a first probe and the second device is a second probe.

10. The speech recognition apparatus of claim 6, wherein the variable pattern information is a field for distinguishing the first device from the second device.

11. A non-transitory computer readable storage medium having stored thereon a program, which when executed by a computer, performs the method defined in claim 1.

* * * * *